(12) United States Patent
Panz et al.

(10) Patent No.: US 8,007,751 B2
(45) Date of Patent: Aug. 30, 2011

(54) HYDROPHILIC PRECIPITATED SILICA FOR DEFOAMER FORMULATIONS

(75) Inventors: Christian Panz, Wesseling (DE); Rene Allerdisse, Cologne (DE); Helga Obladen, Bruehl (DE); Mario Loebbus, Aschaffenburg (DE); Anja Lukas, Hanau (DE); Roland Bergmann, Grosskrotzenburg (DE); Karl Meier, Alfter (DE)

(73) Assignee: Evonik Degussa GmbH, Essen (DE)

( * ) Notice: Subject to any disclaimer, the term of this patent is extended or adjusted under 35 U.S.C. 154(b) by 1436 days.

(21) Appl. No.: 11/036,987

(22) Filed: Jan. 19, 2005

(65) Prior Publication Data
US 2005/0191228 A1   Sep. 1, 2005

(30) Foreign Application Priority Data

Feb. 3, 2004   (DE) .......................... 10 2004 005 409

(51) Int. Cl.
*C01B 33/12*   (2006.01)
(52) U.S. Cl. .......................... 423/335; 423/338; 423/339
(58) Field of Classification Search .................. 106/306, 106/308, 481; 423/335, 338–339; 523/216, 523/209; 524/492, 588
See application file for complete search history.

(56) References Cited

U.S. PATENT DOCUMENTS

| | | | | |
|---|---|---|---|---|
| 4,127,641 | A | * | 11/1978 | Aldcroft et al. ............... 423/339 |
| 4,463,108 | A | * | 7/1984 | Wagner et al. ................ 523/216 |
| 4,495,167 | A | * | 1/1985 | Nauroth et al. ............... 423/339 |
| 5,412,018 | A | * | 5/1995 | Krivak et al. ................. 524/492 |
| 5,846,506 | A | * | 12/1998 | Esch et al. .................... 423/338 |
| 5,908,660 | A | * | 6/1999 | Griffith et al. ................ 427/220 |
| 5,911,963 | A | * | 6/1999 | Krivak et al. ................. 423/335 |
| 5,989,510 | A | * | 11/1999 | Abe et al. ...................... 423/339 |
| 6,184,408 | B1 | * | 2/2001 | Burns et al. ................... 556/450 |
| 6,191,122 | B1 | | 2/2001 | Lux et al. |
| 6,197,384 | B1 | * | 3/2001 | Schubert et al. ............. 516/120 |
| 6,846,865 | B2 | | 1/2005 | Panz et al. |
| 2003/0003040 | A1 | * | 1/2003 | Lindner et al. ................ 423/335 |
| 2003/0082090 | A1 | * | 5/2003 | Blume et al. .................. 423/335 |
| 2003/0130379 | A1 | | 7/2003 | Panz et al. |
| 2003/0144404 | A1 | | 7/2003 | Schachtely et al. |
| 2003/0162881 | A1 | | 8/2003 | Panz et al. |
| 2003/0195290 | A1 | | 10/2003 | Scholz et al. |

FOREIGN PATENT DOCUMENTS

WO   WO 03/014020 A1   2/2003

* cited by examiner

*Primary Examiner* — Anthony J Green
*Assistant Examiner* — Pegah Parvini
(74) *Attorney, Agent, or Firm* — Oblon, Spivak, McClelland, Maier & Neustadt, L.L.P.

(57) ABSTRACT

Precipitated silicas with a high pH and their use in applications as defoamers having optimum silanol group density and a process for preparing precipitated silicas and to their use, particularly in defoamer formulations.

31 Claims, 5 Drawing Sheets

HYDROPHILIC PRECIPITATED SILICA FOR DEFOAMER FORMULATIONS

BACKGROUND OF THE INVENTION

1. Field of the Invention

The present invention relates to hydrophilic precipitated silicas of high pH and low silanol group density, to a process for preparing them and to their use, such as for defoamers, fillers and carriers.

2. Description of the Related Art

Hydrophilic precipitated silicas and processes for preparing them are known. Normally the silica is precipitated by simultaneous addition of an alkali metal silicate or alkaline earth metal silicate and an acidifying agent to an initial charge of water or silicate solution. Following precipitation the pH of the resulting suspension is adjusted to levels of between 2 and 4 by addition of acidifying agent, in order to prevent continuation of the reaction, and is then filtered, the filter product is dried and the dried silica is ground where appropriate. At the end of the production operation the resulting precipitated silicas then have a roughly neutral pH, i.e., pH values of between 6 and 8. Examples of such precipitations are found in EP 0 647 591 and EP 0 901 986. WO 2003014020 proposes precipitated silicas having a pH of at least 9.5 as support materials. WO 2003014020 teaches that the hydrophilic precipitated silicas with a pH of at least 9.5 must be rendered hydrophobic before they can be used as a component in defoamer formulations.

The use of hydrophilic and hydrophobic precipitated silicas in defoamer formulations is likewise known (Pigments Technical Bulletin 42, DEGUSSA, 06/1986). Utility in defoamer formulations imposes exacting requirements on the precipitated silicas. Thus they ought to be readily and effectively dispersible into the defoamer formulation and ought to lead to a rapid knockdown time (response time), complete knockdown (immediate effect) and long holddown (service life). Knockdown describes the ability of the defoamer to reduce the height of the foam immediately following addition, down to a defined height of the foam. Holddown characterizes the service life of the defoamer, i.e., the duration of its activity. Specifically a measurement is made of the time taken for the foam to regain a defined level. Alongside these the knockdown time characterizes the time taken to reach knockdown, relative to the foam maximum. Prior art precipitated silicas have unsatisfactory values for some if not all of the stated parameters.

SUMMARY OF THE INVENTION

Accordingly, it is an object of the present invention to provide new precipitated silicas having very good performance properties, particularly in defoamer formulations. The intention is also to provide a process by which the precipitated silicas of the invention can be prepared.

Surprisingly it has been found that this object is achieved by the silicas of the invention defined in more detail in the description below and also in the claims and the examples, and by the process described in more detail in the description, examples and claims.

In one embodiment, the present invention provide a hydrophilic alkaline precipitated silica having low silanol group density, characterized by the following physicochemical parameters:

| | |
|---|---|
| BET | 100-190 $m^2/g$ |
| Modified Sears number | 8-20 ml/(5 g) |
| Sears number/BET ratio | <0.12 ml/(5 $m^2$) |
| pH | >8 |

The invention further provides hydrophilic precipitated silicas which in addition to the abovementioned parameters, independently of one another, have one or more of the following physicochemical parameters:

| | |
|---|---|
| CTAB | 100-190 $m^2/g$ |
| BET/CTAB ratio | 0.8-1.2 |
| DBP | <300 g/(100 g) |
| Mean particle size $d_{50}$ | <14 µm |
| Tapped density | <150 g/l |
| Loss on ignition | 2-6% |
| Loss on drying | 1-6% |

In another embodiment, the present invention provides a process by which the precipitated silicas of the invention can be prepared, comprising the following steps:
a) precipitating a precipitation silica,
b) filtering,
c) liquefying the filtercake by adding water,
d) drying the suspension,
f) milling the precipitated silica,
which further comprises performing a step
e) alkalifying the precipitated silica by adding at least one basic agent.

Step e) can be carried out both before and after step d).

In further embodiments, the invention provides for the use of the precipitated silicas of the invention, particularly in defoamer formulations.

The inventors recognized that precipitated silicas particularly suitable for use in defoamer formulations are preferably of a nature such that they may insert themselves optimally at the interface between oil and water. This permits effective destruction of foam bubbles. It was found to be important for the surface of the precipitated silicas to have an optimum density of hydrophilic centers. The number of hydrophilic centers on the silica surface is controlled by adjusting the pH. The higher the pH of the end product, the more pronounced the hydrophilic centers on the silica surface that are necessary for the defoamer application. Hydrophilic centers, however, can come about at those sites on the surface of the precipitated silica where silanol groups were present prior to treatment with the basic component. In some cases hydrophilic centers can come about only where silanol groups were present prior to treatment. In order not to give the silica too sharp a hydrophilic character it is important that the precipitated silicas of the invention have an optimum silanol group density. A measure of the absolute number of silanol groups is the modified Sears number. This silanol group density can thus be expressed by the Sears number/BET ratio. The precipitated silicas of the invention are therefore distinguished by a high pH and simultaneous low silanol group density. The hydrophilic precipitated silicas of the invention feature not only the high pH and optimum silanol group density but also
  low tapped density
  an optimized loss on ignition
  an optimized particle size
  an optimized Sears number.

They therefore provide outstandingly performance as a defoamer component in defoamer formulations. In particular they provide a short knockdown time, virtually complete knockdown and long hold down. It is further possible to incorporate the precipitated silicas of the invention into defoamer formulations with particular ease and homogeneity.

DETAILED DESCRIPTION OF THE PREFERRED EMBODIMENTS

The precipitated silicas of the invention have the following physicochemical parameters:

| BET | 100-190 m²/g |
|---|---|
| Modified Sears number | 8-20 ml/(5 g) |
| Sears number/BET ratio | <0.12 ml/(5 m²) |
| pH | >8. |

Additionally they may optionally, independently of one another, have one or more of the following physicochemical parameters:

| CTAB | 100-190 m²/g |
|---|---|
| BET/CTAB ratio | 0.8-1.2 |
| DBP | <300 g/(100 g) |
| Mean particle size d50 | <14 μm |
| Tapped density | <150 g/l |
| Loss on ignition | 2-6% |
| Loss on drying | 1-6% |

The precipitated silicas of the invention preferably have a BET surface area of 120-190 m²/g, more preferably 125-175 m²/g, very preferably 135-175 m²/g, and in particular 140-175 m²/g. The precipitated silicas of the invention may have CTAB surface areas which are preferably 120-190 m²/g, more preferably 125-175 m²/g and even more preferably 135-165 m²/g. The BET/CTAB ratio of the precipitated silicas of the invention may be in the range of from 0.9 to 1.2, more preferably at from 0.9 to 1.15, even more preferably 0.95 to 1.10, and additionally they may have a preferred oil absorption DBP of 180-260 g/(100 g), preferably 190-250, even more preferably 200-240 g/(100 g).

A basic component is added during the preparation of the precipitated silicas to adjust the pH of the dry silica. The higher the pH of the end product, the more pronounced the hydrophilic centers on the silica surface that improve the defoamer application. Accordingly the pH of the precipitated silica of the invention is preferably between 8 and 10, more preferably from 8.5 to 10, and in particular from greater than or equal to 8.5 to less than 9.5.

The modified Sears number of the precipitated silicas of the invention is preferably 8-16 ml/(5 g), more preferably 8-15 ml/(5 g), very preferably 9-14 ml/(5 g), and in particular 10-14 ml/(5 g).

Hydrophilic centers are preferably present on the silica surface at those sites where silanol groups were present prior to treatment with the basic component. Hydrophilic centers are more preferably present only on the silica surface where silanol groups were present prior to treatment with the basic component. In order not to give the silica too sharp a hydrophilic character it is important that the precipitated silica of the invention has a low silanol group density. This silanol group density can be expressed by the Sears number/BET ratio. The precipitated silicas of the invention preferably have a Sears number/BET ratio of <0.11 ml/(5 m²), more preferably <0.1 ml/(5 m²), very preferably from 0.07 to 0.11 ml/(5 m²) and from 0.07 to 0.1 ml/(5 m²).

The mean particle size $d_{50}$, which is a prerequisite for effective and homogeneous incorporation into the defoamer formulation, is preferably <10 μm, more preferably <7.5 μm, very preferably <6 μm and in particular <5 μm.

Finally, the precipitated silicas of the invention can have a preferred tapped density of <100 g/l, more preferably ≦80 g/l and ≦70 g/l and a preferred loss on ignition of 2-4%, more preferably 2.2-3.8%, and even more preferably from 2.5-3.5%.

All stated ranges of preference can be set independently of one another.

The precipitated silicas of the invention can be prepared by a process comprising the steps of
 a) precipitating a precipitation silica,
 b) filtering,
 c) liquefying the filtercake by adding water,
 d) drying the suspension,
 f) milling the precipitated silica,
which comprises performing a step of
 e) alkalifying the precipitated silica by adding at least one basic agent.

Step e) may be carried out at different points in time in the process of the invention. This is addressed in detail in the text below.

The alkalized precipitated silica is subsequently milled in step f).

Step a) of the process of the invention preferably involves carrying out the steps of
 aa) heating an initial charge of water, or of water mixed with waterglass, to a temperature of between 60 and 100° C., preferably between 70° C. and 90° C.
 ab) simultaneously adding waterglass and acid to the initial charge
 ac) lowering the pH by adding an acidifier.

The simultaneous addition of waterglass and acidifier in step ab) is made preferably such that the pH is held at a level of between 7 and 11, preferably 8 to 9. The pH is measured at 60° C. The temperature of the reaction solution is held in step ab) at a level of between 60 and 100° C., preferably between 65 and 95° C., more preferably between 70 and 90° C. The addition of acidifier and waterglass is continued to a solids content of 40 to 70 g/l, preferably from 45 to 65 g/l, more preferably from 50 to 60 g/l and then stopped. This gives a precipitation time of 70 to 140 minutes, preferably 80 to 130 minutes.

In step ac) the pH of the precipitation suspension is adjusted by adding an acidifier, which is preferably identical to that from step ab), to a level of 2 to 8, preferably from 2.5 to 4.0, more preferably from 3 to 4. The pH is measured at 60° C. By means of the procedure described here, in the course of the precipitation, a low silanol group density is established on the surface of the precipitated silica.

The waterglass used in step ab) has a modulus of 3 to 3.8, preferably from 3.3 to 3.5, and a density of 1.1 to 1.39 g/ml, preferably from 1.2 to 1.36 g/ml, more preferably from 1.3 to 1.4 g/ml. Waterglass is a soluble silicate such as sodium or potassium silicate.

The acidifier used in steps ab) and ac) may be a mineral acid, particularly sulfuric acid, hydrochloric acid, phosphoric acid, nitric acid or carbonic acid, or carbon dioxide. Preference is given to sulfuric acid with a concentration of 1 to 18.76 mol/l, preferably from 6 to 18.8 mol/l, more preferably 10 to 18.8 mol/l.

Step ac) may be followed if desired by a step ad) aging the precipitation suspension at 10 to 95° C., preferably at 40 to 60° C., for 0 to 72 hours, preferably for 0 to 12 hours, more preferably from 2 to 6 hours.

In step b) the precipitation suspension is filtered and the filtercake is washed. The filtering of the precipitation suspension, prepared beforehand, and the washing of the filtercake are performed by known methods, such as by filtration with a membrane filter press (Ullmann's Encyclopedia of Industrial Chemistry, 1992, 5th edition, vol. B1, page 10-1-10-59). The filtercake is washed using preferably deionized water. The filtercake obtained has a solids content of 13 to 25%, preferably 15 to 17%.

In step c) the filtercake is liquefied. In one embodiment of the process of the invention the filtercake is liquefied by adding water, preferably deionized water, and preferably with stirring.

In another embodiment, step c) is carried out together with step e). In other words the filtercake is liquefied with the addition of water, preferably deionized water, and with stirring. By simultaneous (steps: c)+e)) or subsequent (steps: c)→e)) addition of one or more basic components, the pH of the suspension is adjusted to values between 7 and 11, advantageously greater than 8, preferably between 8-10.5, 8 and 10 and more preferably to values of 8 to less than 9.5.

Where two process steps are joined by a "+" sign (e.g., c)+e)), this means that the two process steps can be carried out together. Where, in contrast, the process steps are joined by a "→" sign (e.g., c)→e)), this means that the process steps are carried out one after the other.

Independently of the embodiment of step c) the suspension obtained has a solids content of 6 to 20%, preferably 6 to 17%, more preferably 6 to 11%. In both embodiments it may be necessary for liquefication to take place with exposure to shear energy. The amount of shear energy introduced should only be just enough for liquefication.

The suspension obtained from the preceding process stages is dried in step d). A wide variety of drying methods are known to the skilled worker for this purpose (see for example Ullmann's Encyclopedia of Industrial Chemistry, 1992, 5th edition, vol. B1, page 7-21-7-25, incorporated herein by reference). Drying by means of pneumatic conveying drier, spray dryer, rack dryer, belt dryer, rotary tube dryer, flash dryer, spin-flash dryer or nozzle tower has proven advantageous. Drying takes place with particular preference by spray dryer or nozzle tower.

If the liquefication of the filter cake in step c) takes place without addition of a basic agent, then the basic component may be sprayed onto the precipitated silica after drying in a mixer, e.g., a low-shear plowshare mixer such as a Lödige mixer, for example. In this case, then, step e) takes place after step d). The pH of the precipitated silica in this case is adjusted to a figure between 7 and 11, favorably greater than 8, preferably between 8 and 10, more preferably between 8.5 and 10, and in particular greater than 8.5 and less than 9.5.

As the basic component in step e) it is possible to use alkali metal hydroxides or carbonates, alkaline earth metal hydroxides or carbonates, alkali metal oxides, alkaline earth metal oxides, alkali metal silicates, alkaline earth metal silicates, ammonia and alkali metal aluminates or aqueous solutions or mixtures of said bases. Preference is given to using sodium hydroxide and potassium hydroxide solutions.

It is also possible to add a basic component both during step c) and after step d). In that case the basic components referred to above can be used.

If the alkalification in step e) is carried out after step d), it is preferably followed by a further drying step thereafter.

The milling and classifying of precipitated silicas (step f) takes place in accordance with known methods (see for example Ullmann's Encyclopedia of Industrial Chemistry, 1992, 5th edition, vol. B1, page 5-20-5-39, incorporated herein by reference). The precipitated silica of the invention can be milled to the desired ultimate fineness on a variety of mills such as, for example, an impact mill, air jet mill or opposed-jet mill. Classifying may take place during or after milling. In general the hydrophobic precipitated silicas of the invention are milled to a mean particle size $d_{50}$ of <14 μm, preferably <10 μm, more preferably <7.5 μm, very preferably <6 μm and in particular <5 μm.

The precipitated silicas of the invention are used preferably in defoamer formulations for preventing excessive foaming.

The silicas of the invention can additionally be used in all applications in which silicas are commonly used, such as, for example, as a reinforcing filler in silicone rubber formulations, in HTV silicone rubber as a lightening additive in peroxidically crosslinking systems, as a flow assistant, in battery separators, as an antiblocking agent, as a flatting agent in inks and paints, as a carrier, for example, for agricultural products, foodstuffs and pharmaceutical agents, in coatings, in printing inks, in fire-extinguishing powders, in plastics, in the nonimpact printing sector, in paper stock, in the personal care sector, and in specialty applications.

Use in the nonimpact printing sector, such as in the ink-jet process, includes the use of the silicas of the invention in printing inks for thickening or for preventing misting and setoff;

paper as a filler, coating pigment, blueprint paper, heat-sensitive paper, in thermal sublimation for preventing ink strikethrough, for improving contrast and image background uniformity, and for improving dot definition and color brilliance.

Use in the personal care sector refers to the use of the silicas of the invention as a filler or thickener, in the pharmacy or bodycare sector, for example.

Measurement Methods

The physicochemical data of the precipitated silicas of the invention are determined using the following methods:

Determination of BET Surface Area

The specific nitrogen surface area (referred to below as BET surface area) of the pulverulent, spherical or granular silica is determined in accordance with ISO 5794-1/Annex D incorporated herein by reference using an Areameter (Ströhlein, JUWE).

Determination of Specific Surface Area (CTAB)

The method is based on the adsorption of CTAB (N-hexadecyl-N,N,N-trimethylammonium bromide) on the "external" surface of the silica, in a method based on ASTM 3765 or NFT 45-007 (section 5.12.1.3) each of which is incorporated herein by reference.

CTAB is adsorbed in aqueous solution with stirring and ultrasound treatment. Excess, unadsorbed CTAB is determined by back-titration with SDSS (dioctylsodium sulfosuccinate solution, Aerosol OT solution) using a titroprocessor, the endpoint being given by the maximum turbidity of the solution and determined using a phototrode. The temperature throughout all of the operations conducted is 23-25° C., to prevent crystallization of CTAB. The back-titration is based on the following reaction equation:

$(C_{20}H_{37}O_4)SO_3Na$ + $BrN(CH_3)_3(C_{16}H_{33})$

SDSS         CTAB $(C_{20}H_{37}O_4)SO_3N(CH_3)_3(C_{16}H_{33})$ + NaBr Apparatus
Titroprocessor METTLER Toledo type DL 55 and titroprocessor METTLER Toledo type DL 70, each equipped with: pH electrode, Mettler, type DG 111 and phototrode, Mettler, type DP 550
100 ml polypropylene titration beaker
Glass titration vessel, 150 ml, with lid
Pressure filtration device, capacity 100 ml
Cellulose nitrate membrane filter, pore size 0.1 μm, 47 mm Ø, e.g., Whatman (Order No. 7181-004)
Reagents
The solutions of CTAB ($C_{CTAB}$=5.5 g/l in deionized water) and SDSS (0.00423 mol/l in deionized water) are purchased in ready-to-use form (Kraft, Duisburg: Order No. 6056.4700 CTAB solution 0.015 mol/l; Order No. 6057.4700 SDSS solution 0.00423 mol/l), stored at 25° C. and used within a month.
Procedure
1. Blank Titration
The consumption of SDSS solution for titrating 5 ml of CTAB solution should be checked 1× daily before each series of measurements. This is done by setting the phototrode, before beginning the titration, at 1000±20 mV (corresponding to a transparency of 100%).
Precisely 5.00 ml of CTAB solution are pipetted into a titration beaker and 50.00 ml of deionized water are added. Titration with SDSS solution is carried out with stirring by the measurement method familiar to the skilled worker, using the titroprocessor DL 55, until the solution reaches maximum turbidity. The consumption $V_A$ of SDSS solution, in ml, is determined. Each titration should be performed in triplicate.
2. Adsorption
10.0 g of the pulverulent, spherical or granulated silica with a moisture content of 5±2% (if appropriate the moisture content is adjusted by drying at 105° C. in a drying oven or uniform wetting) are comminuted for 30 seconds using a mill (Krups, Model KM 75, Article No. 2030-70). Precisely 500.0 mg of the comminuted sample (initial mass E) are transferred to a 150 ml titration vessel with magnetic stirrer rod and precisely 100.0 ml of CTAB solution ($T_1$) are metered in. The titration vessel is closed with a lid and stirred using an Ultra Turrax T 25 stirrer (stirrer shaft KV-18G, 18 mm diameter) at 18 000 rpm for not more than 1 minute until wetting is complete. The titration vessel is screwed onto the titroprocessor DL 70 and the pH of the suspension is adjusted with KOH (0.1 mol/l) to a figure of 9±0.05. If the pH is already greater than 9 no pH correction is performed, so as not to alter the surface.
The suspension is sonicated for 4 minutes in the titration vessel in an ultrasound bath (Bandelin, Sonorex RK 106 S, 35 kHz) at 25° C. It is followed immediately by pressure filtration through a membrane filter under a nitrogen pressure of 1.2 bar. The initial fraction of 5 ml is discarded.
3. Titration
5.00 ml of the remaining filtrate are pipetted into a 100 ml titration beaker and made up to 50.00 ml with deionized water. The titration beaker is screwed onto the titroprocessor DL 55 and titrated with SDSS solution, with stirring, until maximum turbidity is reached. The consumption $V_B$ of SDSS solution, in ml, is determined. Each turbidity should be performed as a triplicate determination.
Calculation $$CTAB \text{ (without moisture correction)} = \frac{V_A - V_B}{V_A} * \frac{C_{CTAB} * T_1 * P}{E}$$

VA=Consumption of SDSS solution, in ml, in titrating the blank sample
VB=Consumption of SDSS solution, in ml, when using the filtrate
CCTAB=Concentration of CTAB solution in g/l
$T_1$=Amount of CTAB solution added
P=Surface occupancy of 1 g of CTAB=578.435*10−3 m²
E=Initial mass of silica
The CTAB surface is based on the anhydrous silica, which is why the following correction is made.

$$CTAB = \frac{CTAB \text{ (without moisture correction) in m}^2/g * 100}{100 - \text{moisture content in } \%}$$

The moisture content of the silica is determined in accordance with the below-described method of "Determination of Moisture Content or Loss on Drying".
Determination of pH
The method, based on DIN EN ISO 787-9 incorporated herein by reference, serves for determining the pH of an aqueous suspension of silicas at 20° C.
Prior to pH measurement the pH meter (Knick, type 766 pH meter Calimatic with temperature sensor) and the pH electrode (Schott N7680 combination electrode) must be calibrated, using the buffer solutions, at 20° C. The calibration function is to be chosen such that the two buffer solutions used include the expected pH of the sample (buffer solutions of pH 4.00 and 7.00, pH 7.00 and pH 9.00 and, where appropriate, pH 7.00 and 12.00).
5.00 g of pulverulent or spherical, hydrophobic silica with a moisture content of 5±1% (where appropriate the moisture content is adjusted by drying at 105° C. in a drying oven or by uniform wetting prior to any comminution) are weighed to an accuracy of 0.01 g on a precision balance into a wide-necked glass bottle which has been tared beforehand. The suspension is made up to the 100 ml mark using 50.0 ml of analytical-grade methanol and 50.0 ml of deionized water.
Subsequently the suspension is shaken in the sealed vessel for 5 minutes using a shaker machine (Gerhardt, model LS10, 55 W, level 7) at 20° C. The pH is measured directly thereafter. For that purpose the electrode is rinsed first with deionized water and then with a portion of the suspension, and then is immersed into the suspension. A magnetic stirrer bar is then added to the suspension, and the pH measurement is carried out at constant stirring speed with a slight vortex being formed in the suspension. After exactly 5 minutes the pH is read off on the display.

Determination of DBP Absorption

The DBP absorption (DBP number), which is a measure of the absorbency of the precipitated silica, is determined by a method based on standard DIN 53601 incorporated herein by reference, as follows:

12.50 g of pulverulent or spherical silica with a moisture content of 0-10% (the moisture content is adjusted where appropriate by drying at 105° C. in a drying oven) are introduced into the kneader chamber (article number 279061) of the Brabender absorptometer "E" (without damping of the outlet filter of the torque sensor). In the case of granules the sieve fraction from 3.15 to 1 mm (stainless steel sieves from Retsch) is used (by gently pressing the granules with a plastic spatula through the sieve with a pore size of 3.15 mm). With continuous mixing (kneader paddles rotating at a speed of 125 rpm) dibutyl phthalate is added dropwise to the mixture at a rate of 4 mL/min at room temperature by means of the Brabender T 90/50 Dosimat. Its incorporation by mixing takes place with only a small amount of force, and is monitored by means of the digital display. Toward the end of the determination the mixture becomes pasty, which is indicated by a sharp increase in the required force. At a display reading of 600 digits (torque of 0.6 Nm) an electrical contact shuts off both the kneader and the DBP feed. The synchronous motor for the DBP feed is coupled to a digital counter, so that the consumption of DBP in ml can be read off.

The DBP absorption is reported in g/100 g and is calculated using the following formula:

$$DBP = \frac{V*D*100}{E} * \frac{g}{100 \text{ g}} + K$$

where
- DBP=DBP absorption in g/100 g
- V=consumption of DBP in ml
- D=density of DBP in g/ml (1.047 g/ml at 20° C.)
- E=initial mass of silica in g
- K=correction value as per moisture correction table, in g/100 g The DBP absorption is defined for the anhydrous, dried silica. When moist precipitated silicas are used it is necessary to take into account the correction value K for calculating the DBP absorption. This value can be determined using the correction table below: for example, silica having a water content of 5.8% would mean an addition of 33 g/(100 g) for the DBP absorption. The moisture content of the silica is determined in accordance with the below-described method of "determination of moisture content or loss on drying".

Moisture correction table for dibutyl phthalate absorption—anhydrous

| % water | .0 | .2 | .4 | .6 | .8 |
|---|---|---|---|---|---|
| 0 | 0 | 2 | 4 | 5 | 7 |
| 1 | 9 | 10 | 12 | 13 | 15 |
| 2 | 16 | 18 | 19 | 20 | 22 |
| 3 | 23 | 24 | 26 | 27 | 28 |
| 4 | 28 | 29 | 29 | 30 | 31 |
| 5 | 31 | 32 | 32 | 33 | 33 |
| 6 | 34 | 34 | 35 | 35 | 36 |
| 7 | 36 | 37 | 38 | 38 | 39 |
| 8 | 39 | 40 | 40 | 41 | 41 |
| 9 | 42 | 43 | 43 | 44 | 44 |
| 10 | 45 | 45 | 46 | 46 | 47 |

Determination of Modified Sears Number of Silicas

By titrating silica with potassium hydroxide solution in the range from pH 6 to pH 9 it is possible to determine the modified Sear number (called Sears number $V_2$ below) as a measure of the number of free hydroxyl groups.

The determination method is based on the following chemical reactions, where "Si"—OH is intended to symbolize a silanol group of the silica:

10.00 g of a pulverulent, spherical or granular silica with a moisture content of 5±1% are comminuted for 60 seconds using an IKA universal mill M 20 (550 W; 20 000 rpm). It may be necessary to adjust the moisture content of the starting material by drying at 105° C. in a drying oven or by uniform moistening, and to repeat the comminution. 2.50 g of the silica thus treated are weighed out at room temperature into a 250 ml titration vessel and 60.0 ml of analytical-grade methanol are added. When the sample has been wetted completely, 40.0 ml of deionized water are added and dispersion is carried out using an Ultra Turrax T 25 stirrer (stirrer shaft KV-18G, 18 mm diameter) for 30 seconds at a rotary speed of 18 000 rpm. The particles of the sample adhering to the edge of the vessel and the stirrer are rinsed into the suspension using 100 ml of deionized water, and the suspension is conditioned to 25° C. in a thermostatted waterbath.

The pH meter (Knick, type: 766 pH meter Calimatic with temperature sensor) and the pH electrode (Schott N7680 combination electrode) are calibrated at room temperature using buffer solutions (pH 7.00 and 9.00). The pH meter is used first to measure the initial pH of the suspension at 25° C., and then depending on the result the pH is adjusted to 6.00 using potassium hydroxide solution (0.1 mol/l) or hydrochloric acid solution (0.1 mol/l). The consumption of KOH or HCl solution in ml to reach pH 6.00 corresponds to V1'.

Thereafter 20.0 ml of sodium chloride solution (250.00 g of analytical-grade NaCl made up to 1 l with deionized water) are metered in. Using 0.1 mol/l KOH, the titration is then continued to a pH of 9.00. The consumption of KOH solution in ml to reach pH 9.00 corresponds to V2'.

Subsequently the volumes V1' and V2' are first standardized to the theoretical sample weight of 1 g and expanded by a factor of 5, giving V1 and the Sears number V2 in the units ml/(5 g).

Determination of Methanol Wettability

Hydrophobic silicas and silicates can be made water-wettable by adding methanol. This is done by means of methanol/water mixtures of different concentration. In this way it is possible to draw conclusions concerning the degree of hydrophobicization of the silicas or silicates.

Procedure:

200 mg of each hydrophobic silica or silicate are weighed out into 6 centrifuge tubes each with a capacity of 15 ml, and to each of the tubes there are added 8 ml of a methanol/water mixture of ascending methanol concentration.

The methanol concentration of the mixtures is guided by the anticipated methanol wettability. The centrifuge tubes are tightly closed and then shaken vigorously (10 up-and-down movements). To separate the wetted silica/silicate fractions, the tubes are then centrifuged at 2500 rpm for 5 minutes. The wetted fractions from a sediment whose volume can be read off on the scale on the centrifuge tubes. The sediment volumes are plotted against the methanol/water mixture concentration on a graph.

The individual measurement points produce a curve (x axis: percentage fraction of methanol in the methanol/water mixtures, y axis: height of sediment) whose position and slope characterizes the degree of hydrophobicization of the precipitated silica. As a measure of the hydrophobicization the x-axis value (in %) at the point of inflection of the curve is stated.

Determination of Mean Particle Size (d50)

The application of laser diffraction for the determination of particle sizes is based on the phenomenon whereby particles scatter monochromatic light with a different intensity pattern in all directions. This scattering is dependent on the particle size. The smaller the particles the greater the scattering angles.

Sample Preparation:

In a 50 ml screw-top glass container, 4 ml of the powder are mixed with 30 ml of ethanol, by shaking.

Procedure:

Prior to the beginning of the measurement the laser diffraction instrument LS 230 (COULTER) and the liquid module (small volume module plus, 120 ml, COULTER) are warmed up for 2 h and the module is rinsed three times with ethanol. An offset measurement and an adjustment are made by the instrument automatically each hour. In the control bar of the instrument software the file window "Calculate opt. model" is selected via the menu item "Measurement" and the refractive indices are defined in an .rfd file: liquid refractive index B.I. real=1.333; material refractive index real=1.46; imaginary=0.1. The pump speed is set at 50%.

In principle a background measurement is carried out automatically before each measurement. A single-use pipette is rinsed three times with the suspension before each sampling. About 2 ml of the suspension are taken up with the pipette and 1-3 drops are metered immediately into the liquid module of the instrument. The remainder in the single-use pipette is introduced back into the glass beaker. Following the addition there is a waiting time until the laser diffraction instrument indicates constant concentration. Suspension is added until a light absorption figure of 8 to 12% is reached and the instrument reports "OK". The measurement is made at room temperature with the evaluation model of the above-determined .rfd file.

First of all a particle measurement without ultrasound is carried out. This is followed by a second, third and fourth measurement of the same sample, with the ultrasound device (SONICS VIBRACELL) switched on at a power of 20 W for 1, 2 and 3 minutes respectively. If the measurements differ substantially from one another then they must be repeated. If the differences remain even after repetition then the measurement reported is that which comes closest to a monomodal Gaussian particle size distribution. Thus, for example, spray-dried, hydrophobicized, unmilled samples typically give reproducible, substantially monomodal particle size distributions when measured without ultrasound treatment. In the case of hydrophobicized, finely milled samples, reproducible, approximately monomodal particle size distributions are often seen only after 2 to 3 minutes of ultrasound. In the case of very finely divided samples it is possible for agglomeration phenomena to occur to a certain extent in the case of prolonged ultrasound treatment.

In case of doubt, either all values are reported or the measurements are labeled accordingly. The codes for 0, 1, 2 and 3 minutes of ultrasound are as follows: 0 min.US, 1 min.US, 2 min.US and 3 min.US.

From the raw data plot the software calculates the particle size distribution on the basis of the volume distribution, taking into account the Mie theory and the optical model parameters (.rfd file).

Determination of Filtercake Solids Content 100.00 g of the filtercake are weighed out (initial mass E) into a dry, tared porcelain dish (diameter 20 cm). The filtercake is broken up with a spatula if necessary to give relatively loose lumps with a maximum volume of 1 cm$^3$. The sample is dried to constant weight in a drying oven at 105±2° C. Subsequently the sample is cooled to room temperature in a desiccator cabinet with silica gel as desiccant. The final mass A is determined gravimetrically.

The solids content in % is determined in accordance with $$SC=A/E*100,$$

where
SC=solids content in %
A=final mass in g
E=initial mass in g

Determination of Suspension Solids Content

The solids content of the precipitated suspension is determined gravimetrically by filtering the sample.

Procedure 100.0 ml of the homogenized precipitation suspension ($V_{suspension}$) are measured off at room temperature using a measuring cylinder. The sample is filtered through a circular filter (TYPE 572 from SCHLEICHER & SCHUELL) in a porcelain suction filter unit, but is not sucked dry, so as to prevent cracking of the filter cake. Subsequently the filtercake is washed with 100.0 ml of deionized water. The washed filtercake is filtered completely, transferred to a tared porcelain dish and dried to a constant weight in a drying oven at 105±2° C. The weight of the dried silica ($m_{sample}$) is determined.

The solids content in g/l is determined in accordance with:
solids content i=$m_{sample}/V_{suspension}$, where
$m_{sample}$=weight of dried silica
$V_{suspension}$=volume of precipitation suspension investigated Determination of Moisture Content or Loss on Drying The moisture content or loss on drying (LD) of silicas is determined by a method based on ISO 787-2 (incorporated herein by reference) after 2-hour drying at 105° C. This loss on drying is accounted for predominantly by aqueous moisture.

10 g of the pulverulent, spherical or granular silica is weighed out to an accuracy of 0.1 mg (initial mass E) into a dry glass weighing boat with ground-glass lid (diameter 8 cm, height 3 cm). With the lid open, the sample is dried in a drying oven at 105±2° C. for 2 h. Thereafter the weighing boat is closed and cooled to room temperature in a desiccator cabinet with silica gel as drying agent.

The weighing boat is weighed to an accuracy of 0.1 mg on a precision balance, in order to determine the final weight A. The moisture content (LD) in % is determined in accordance with $$LD=(1-A/E)*100,$$

where A=final mass in g and E=initial mass in g.

Determination of Loss on Ignition

According to this method the loss on ignition of silica at 1000° C. is determined in a method based on DIN EN ISO 3262-1 (incorporated herein by reference). At this temperature physically and chemically bound water and other volatile constituents escape. The moisture content (LD) of the sample investigated is determined by the afore-described method "determination of moisture content or loss on drying" in a method based on DIN EN ISO 787-2 (incorporated herein by reference).

0.5 g of the pulverulent, spherical or granular silica are weighed out to an accuracy of 0.1 mg into a tared porcelain crucible purified by calcining beforehand (initial mass E). The sample is heated in a muffle furnace at 1000±50° C. for 2 h. The porcelain crucible is subsequently cooled to room temperature in a desiccator with silica gel as drying agent. The final mass A is determined gravimetrically.

The loss on ignition (DIN) LOI in % is obtained in accordance with $$LOI=(1-A/F)*100.$$

F denotes the corrected initial mass in g, based on dry matter, and is calculated according to $$F=E*(1-LD/100).$$

In the calculations A denotes final mass in g, E denotes initial mass in g and LD denotes loss on drying, in %.

Determination of Tapped Density

The tapped density is determined in a method based on DIN EN ISO 787-11 (incorporated herein by reference).

A defined amount of a sample which has not been sieved beforehand is introduced into a graduated glass cylinder and subjected to a fixed number of jolts by means of a jolting volumeter. In the course of jolting the sample undergoes compaction. The result of the analysis conducted is the tapped density.

The measurements are carried out on a jolting volumeter with counter from Engelsmann, Ludwigshafen, type STAV 2003.

First of all a 250 ml glass cylinder is tared on a precision balance. Then 250 ml of silica are introduced with the aid of a powder funnel into the tared graduated cylinder in such a way that no cavities are formed. This is achieved by inclining and rotating the cylinder about its longitudinal axis in the course of introduction. Subsequently the sample quantity is weighed to an accuracy of 0.01 g. Thereafter the cylinder is tapped lightly so that the surface of the silica in the cylinder is horizontal. The graduated cylinder is inserted into the corresponding holder on the jolting volumeter and jolted 1250 times. The volume of the jolted sample is read off to an accuracy of 1 ml after one jolting process.

The tapped density D(t) is calculated as follows:

$$D(t)=m*1000/V$$

D(t): tapped density in g/l
V: volume of silica after jolting, in ml
m: mass of silica in g The examples below are intended to illustrate the invention without restricting its scope.

Example 1

63 l of deionized water were charged to an 80 l precipitating vessel and heated to 88° C. Waterglass was added to this initial charge (modulus=3.5; density=1.343 g/ml) at a metering rate of 6.5 l/h and sulfuric acid (concentration=7.167 mol/l) was added with a metering rate of 1.56 l/h, metering taking place so as to maintain a pH of 8.0-8.5 (measured on a sample with a temperature of 60° C.). After 100 minutes the metered feeds ended. Subsequently the precipitation suspension was acidified to a pH of 3.0 with sulfuric acid (concentration=7.167 mol/l), with the same metering rate as before, and the suspension was then aftertreated in a drying oven at 50° C. for a period of 22 hours.

The suspension was filtered and washed sufficiently with deionized water. The resulting solids content of the filtercake was 15-17%.

With deionized water introduced initially, and with gentle stirring, the filtercake was liquefied so as to give a silica suspension with a solids content of 6-11%. This suspension was then adjusted to a pH of 9 using NaOH solution (50% by weight). Immediately thereafter the suspension was spray dried (drier exit temperature: 130° C.). The dried precipitated silica was milled using an opposed-jet mill (50 AFG, HOSOKAWA-ALPINE).

The resulting product had the following physicochemical parameters:

| | |
|---|---|
| BET | 152 m$^2$/g |
| CTAB | 158 m$^2$/g |
| BET/CTAB ratio | 0.96 |
| DBP (anhydrous) | 246 g/(100 g) |
| pH | 8.5 |
| Mod. Sears number | 11.5 ml/(5 g) |
| Sears/BET ratio | 0.076 ml/(5 m$^2$) |
| Loss on drying | 1.0% |
| Loss on ignition | 3.4% |
| Tapped density | 41 g/l |
| Mean particle size d$_{50}$ | 2.6 μm |

Example 2

1679 l of deionized water was charged to an 2 m$^3$ precipitating vessel and heated to 88° C. Added to this initial charge was waterglass (modulus=3.5; density=1.343 g/ml) at a metering rate of 3.93 kg/h and sulfuric acid (concentration=17.62 mol/l) with a metering rate of 0.509 kg/h, metering taking place so as to maintain a pH of from 8.0 to 8.5 (measured on a sample with a temperature of 60° C.). After 100 minutes the metered feeds ended. Subsequently the precipitation suspension was acidified to a pH of 3.0 with sulfuric acid (concentration=17.62 mol/l), with the same metering rate as before, and the suspension was then aftertreated in an aging vessel at 50° C. for a period of 22 hours.

The suspension was filtered and washed sufficiently with deionized water. The resulting solids content of the filtercake was 15-17%.

With deionized water introduced initially, and with gentle stirring, the filtercake was liquefied so as to give a silica suspension with a solids content of 6-11%. This suspension was then adjusted to a pH of 9.5 using NaOH solution (50% by weight). Immediately thereafter the suspension was spray dried (drier exit temperature: 90° C.). The dried precipitated silica was milled using an opposed-jet mill (50 AFG, HOSOKAWA-ALPINE).

The resulting product had the following physicochemical parameters:

| | |
|---|---|
| BET | 145 m$^2$/g |
| CTAB | 156 m$^2$/g |
| BET/CTAB ratio | 0.93 |
| DBP (anhydrous) | 218 g/(100 g) |
| pH | 9.4 |
| Mod. Sears number | 15.3 ml/(5 g) |

| | |
|---|---|
| Sears/BET ratio | 0.106 ml/(5 m$^2$) |
| Loss on drying | 1.96% |
| Loss on ignition | 2.88% |
| Tapped density | 80 g/l |
| Mean particle size d$_{50}$ | 3.4 μm |

Examples 3 to 4 and Comparative Examples 1

In Examples 3 to 4 and in comparative example 1 precipitated silicas were investigated for their suitability in defoamer formulations. The properties of precipitated silicas were investigated using model formulations which cover a wide range of the fields of application and formulations that are used industrially.

A basic prerequisite for an effective formulation is an efficient dispersion step of the highly dispersed precipitated silica in selected oils. The task here is to distribute the precipitated silica as homogeneously as possible in the oil phase without destroying it through excessive shearing forces.

Preparation of a Dispersion of Precipitated Silica in Silicone Oil

Reagents
Silicone oil "DC 200/100 cs" (polydimethylsiloxane, Dow Corning, data sheet of Mar. 31, 1998)
Hydrophobic precipitated silica
Apparatus
Analytical balance
Glass beaker 250 ml, height: 120 mm; diameter: 60 mm
Ultra Turrax T50 (Janke & Kunkel)
Procedure
Preparing the Silicone Oil Dispersions:

7.00 g of silicone oil and 3.00 g of the test precipitated silica are weighed out on an analytical balance into a 250 ml glass beaker. The precipitated silica is carefully stirred in using a spatula until it is completely wetted. The system is subsequently dispersed with an Ultra Turrax T50 at 10 000 rpm for 10 minutes. The dispersion may undergo warming during this operation.

After the dispersion has been cooled to room temperature it can be used for the performance tests.

Preparation of a Dispersion of Precipitated Silica in Mineral Oil

Reagents
Mineral oil "SHELL RISELLA Oil G 18" (Deutsche Shell, data sheet VSV-T (F) Aug. 7, 1996)
Hydrophobic precipitated silica
Apparatus
Analytical balance
Glass beaker 250 ml, height: 120 mm; diameter: 60 mm
Ultra Turrax T50 (Janke & Kunkel)
Procedure 57.00 g of mineral oil and 3.00 g of the test precipitated silica are weighed out on an analytical balance into a 250 ml glass beaker. The precipitated silica is carefully stirred in using a spatula until it is completely wetted. The system is subsequently dispersed with an Ultra Turrax T50 at 10 000 rpm for 10 minutes. The dispersion may undergo warming during this operation. After the dispersion has been cooled to room temperature it can be used for the performance tests.

Test of Defoaming Action

This defoamer test is particularly suitable for depicting foaming systems in motion.

Reagents:
Test detergent, consisting of:
Sodium dodecylbenzenesulfonate (Maranil® Paste A 55, Cognis Dtl. GmbH & Co. KG, datasheet revision No. 9-01.2000)
11.67%
Fatty alcohol C16-C18 with about 5 mol of EO (Dehydol® TA 5, Cognis Dtl. GmbH & Co. KG, datasheet revision No. 3-01.1998)
1.21%
Fatty alcohol C12-C18 with about 7 mol of EO (Dehydol® LT 7, Cognis Dtl. GmbH & Co. KG, datasheet revision No. 6-08.1999)
7.24%
1-Hydroxyethylidene-1,1-diphosphonic acid (Dequest 2010, Brenntag N.V, Belgium)
0.28%
Sodium salt of a maleic acid/acrylic acid copolymer (Sokolan CP5, BASF AG, datasheet TI/ES 1081 d from May 1990)
6.52%

| | |
|---|---|
| Zeolite A compound (Wessalith 4020, Henkel KGaA) | 36.58% |
| Sodium disilicate (Portil N, Cognis Dtl. GmbH & Co. KG) | 3.26% |
| Sodium carbonate | 18.11% |
| Sodium sulfate | 15.13% |

To prepare the test detergent all of the raw materials in powder form are charged to a standard commercial mixer, e.g., a Lödige mixer. The liquid raw materials are sprayed onto the powder materials with stirring. After all of the liquid raw materials have been sprayed on it is necessary to continue mixing for about 10 minutes in order to achieve a homogeneous distribution.

Silicone Oil Dispersion or Mineral Oil Dispersion of Precipitated Silica

Apparatus:
CONTIFOAM apparatus
Gear pump with nozzle
Thermostat
Hotplate
Magnetic stirrer
Microliter pipette The pump test apparatus is depicted diagrammatically in FIG. 1. It includes a jacketed glass vessel (1), a temperature-conditioned oil bath, a gear pump (2) and a foam height detection system employing photoelectric cells (3a and 3b). First of all a wash liquor is prepared by stirring 6 g of the IEC test detergent into 994 g of water. This liquor is adjusted to a pH of 10 by adding sodium hydroxide solution.

Figure 1:
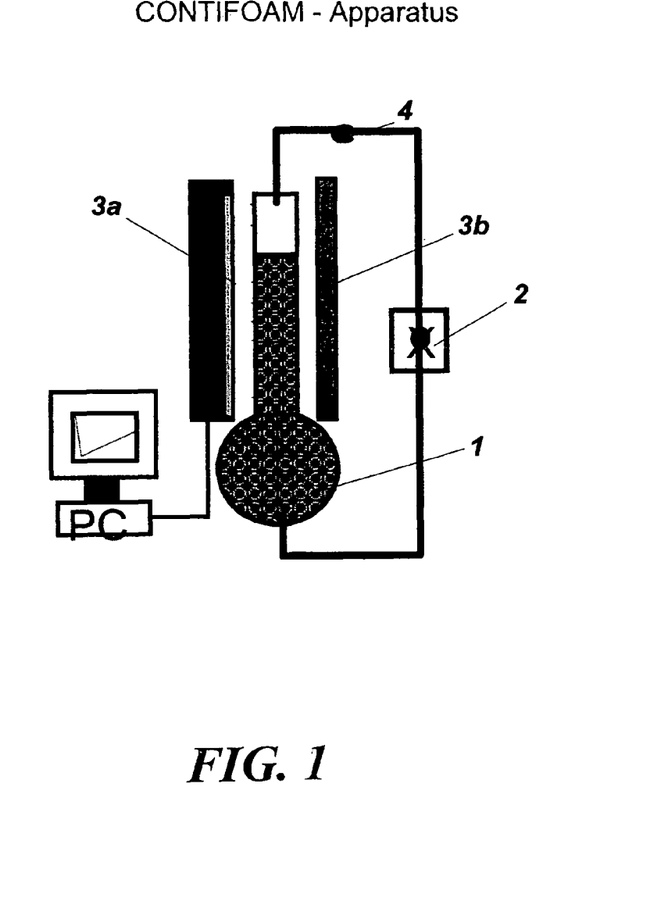
FIG. 1 shows a diagram of the pump test apparatus for measurement of defoaming property of the precipitated silica.
Figure 2:
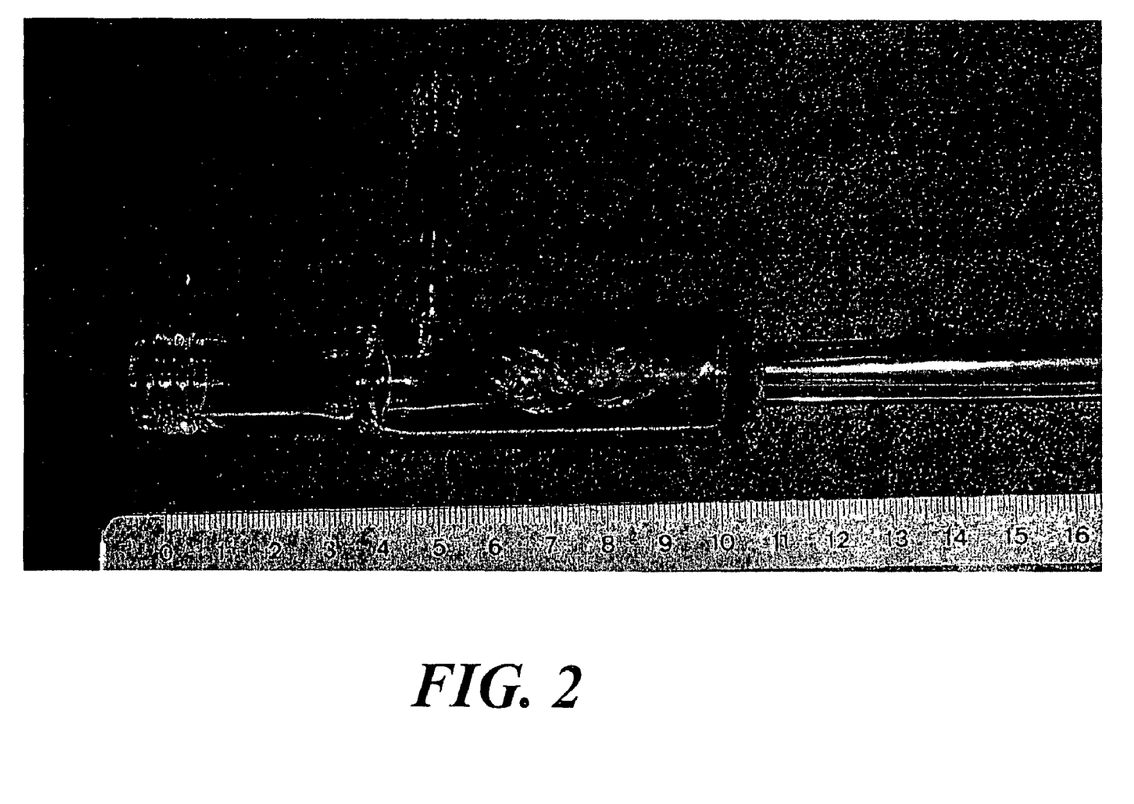
FIG. 2 shows the nozzle apparatus used in the defoaming performance test.

To carry out the test, 500 ml of this wash liquor are introduced carefully into the glass vessel (1). The wash liquor in the glass vessel is heated to 60° C. and, by engaging a gear pump (2) with a delivery rate of 1200 m/min, is conveyed through a nozzle (FIG. 2), the wash liquor being foamed. The nozzle used is a Friedrichs-Antlinger waterjet pump (order No. 181-9401; catalogue "VWR" of 2003). At the same time as the gear pump is engaged, measurement is commenced. On reaching the maximum foam height the test defoamer dispersion ((0.07 ml in the case of mineral oil dispersions and 0.01 ml in the case of silicone oil dispersions) is injected all at once via a septum (4), using a microliter pipette, and the development of the foam height is recorded as a function of time.

Figure 3:
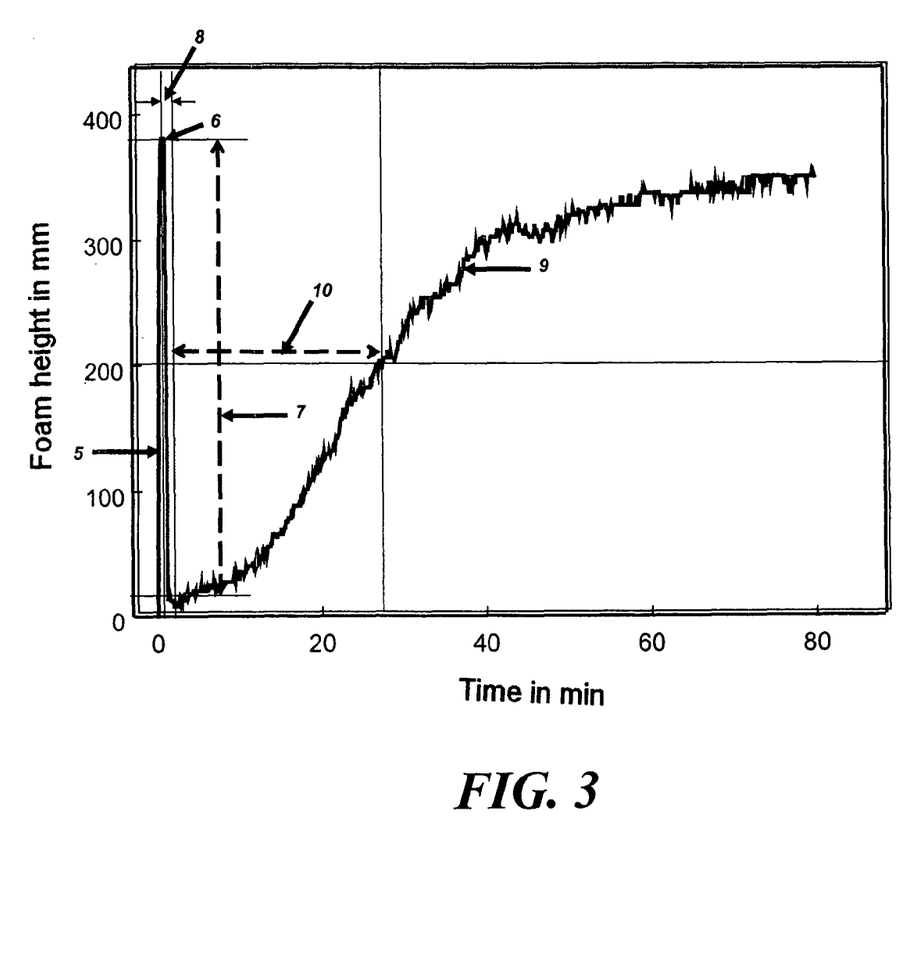
FIG. 3 shows a plot of foam height in the course of the defoaming performance test.

The schematic course of the plot is depicted in FIG. 3. After the gear pump has been engaged the foam rises to (5). When a defined foam height is reached the defoamer formulation is injected (6). The foam collapses in on itself. The remaining foam height emerges as a function of the quality of the defoamer formulation. The ability of the defoamer to reduce the foam height immediately following addition, down to a defined foam height, is described by the knockdown parameter (7). This is defined as the difference between the foam height at the moment when the defoamer formulation is added and the minimal remaining foam height. The time which elapses between addition of the defoamer formulation and attainment of the lowest foam height is referred to as the knockdown time (8). In the further course of the test for defoaming action the action of the defoamer formulation subsides again with a differing rate according to its quality. The foam height rises again to (9). The time which elapses between the moment when the minimum foam height is reached, following the addition of the defoamer formulation, and the time at which a foam height of 200 mm is regained is characterized by the hold down (10) parameter. The hold down is therefore a measure of the service life of the defoamer, i.e., the duration of its activity. Defoamer formulations where the foam height is not reduced to below 200 mm are not assigned a hold down.

The extent of foam formation/amount of foam is regulated by factors including the flow rate, nozzle shape, etc. An advantage of this test method is that a variety of aqueous, thermally conditioned foam solutions can be tested as test solutions under dynamic conditions closely resembling those prevailing in practice. Additionally the defoamer is monitored over a defined period of time. It is possible to state whether the defoamer and hence the silica present therein exhibits an action but also to state how quickly the action begins, how great it is, and how long it lasts. The subsidence of the action of defoamers is a known phenomenon which is accelerated further by extreme conditions (high temperature, high alkalinity, high shearing forces). Since all of these conditions can be mimicked it is possible to say what silica in combination with an oil under real-life conditions exhibits the best defoaming properties.

Example 3

Both a mineral oil dispersion and a silicone oil dispersion were produced from the product from example 1 and were investigated for defoaming action.

Example 4

Both a mineral oil dispersion and a silicone oil dispersion were produced from the product from example 2 and were investigated for defoaming action.

Comparative Example 1

Both a mineral oil dispersion and a silicone oil dispersion were produced from the precipitated silica Zeofoam 166 (Huber), as comparative example 1.

TABLE 1

|  |  | Example 3 | Example 4 | Comparative example 1 |
|---|---|---|---|---|
| BET | m$^2$/g | 152 | 145 | 113 |
| CTAB | m$^2$/g | 158 | 156 | 121 |
| BET/CTAB ratio | — | 0.96 | 0.93 | 0.93 |
| pH | — | 8.5 | 9.4 | 8.5 |
| DBP | g/100 g | 246 | 218 | 267 |
| Mod. Sears number | ml/(5 g) | 11.5 | 15.3 | 21.3 |
| Sears/BET ratio | ml/(5 m$^2$) | 0.076 | 0.106 | 0.188 |
| Loss on drying | % | 1.02 | 1.96 | 5.1 |
| Loss on ignition | % | 3.4 | 2.88 | 3.7 |
| Tapped density | g/l | 41 | 80 | 93 |
| Mean particle size d$_{50}$ (1 min. US/20 W) | μm | 2.6 | 3.4 | 3.8 |
| Knockdown [1] | mm | 335.1 | 344.4 | 355.4 |
| Knockdown time [1] | min | 0.67 | 0.42 | 1.33 |
| Holddown [1] | min | 15.85 | 14.51 | 11.29 |
| Knockdown [2] | mm | 378.3 | 380.0 | 365.6 |
| Knockdown time [2] | min | 0.16 | 0.17 | 0.17 |
| Holddown [2] | min | 2.52 | 2.61 | 2.13 |

Figure 4:
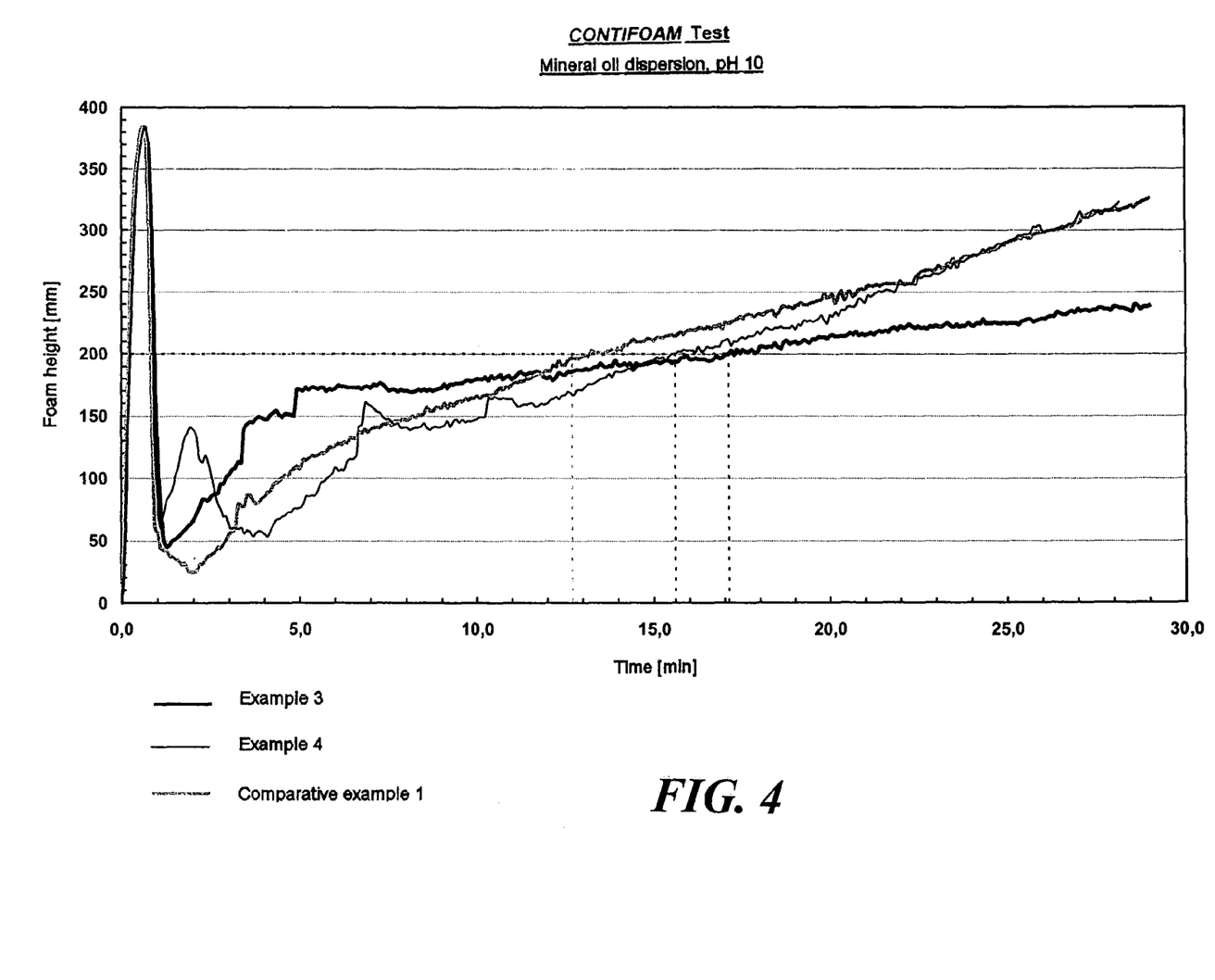
FIG. 4 shows the plot of defoaming performance for Examples 3, 4 and comparative Example 1 for a mineral oil dispersion.
Figure 5:
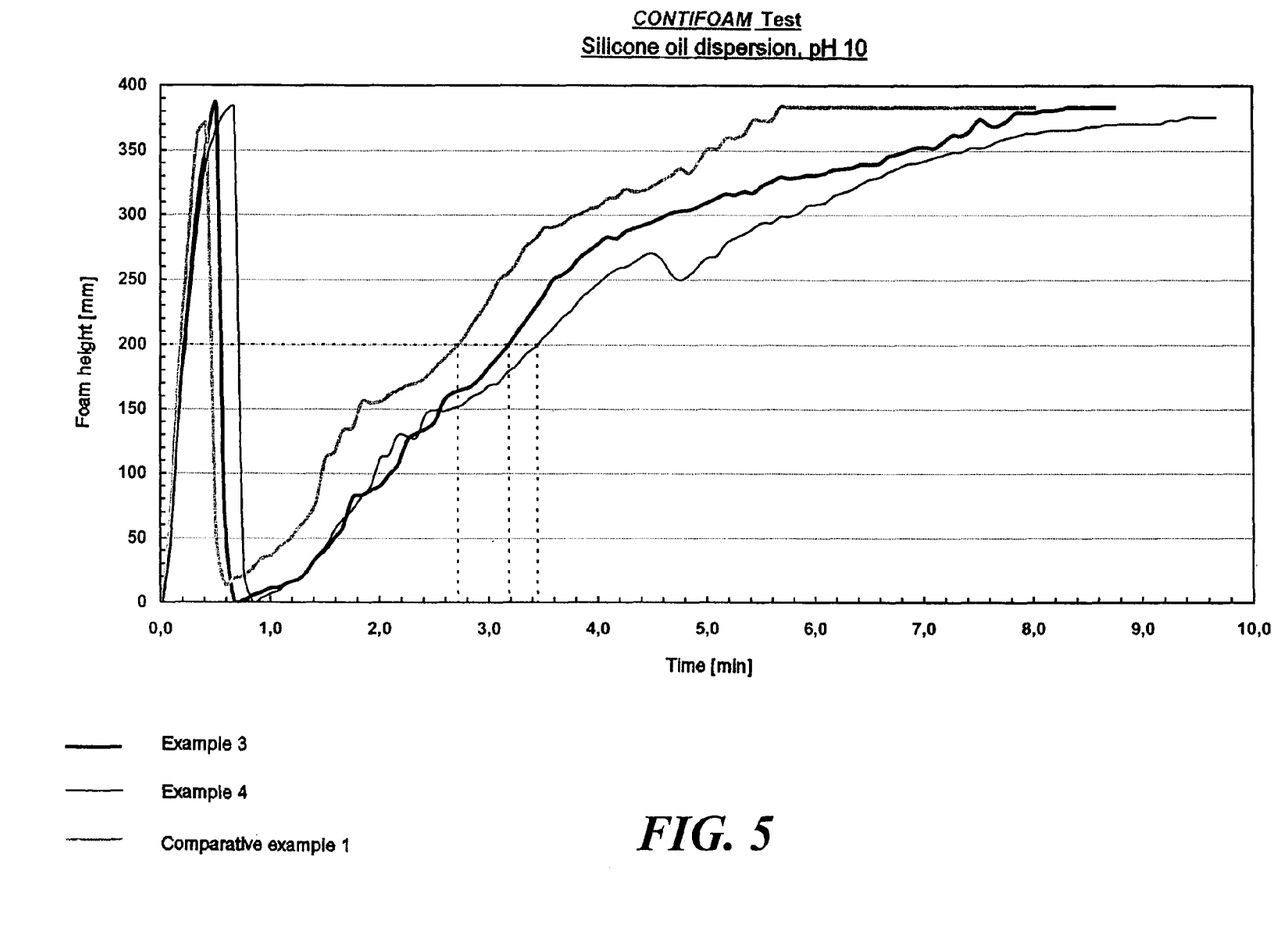
FIG. 5 shows the plot of defoaming performance for Examples 3, 4 and comparative Example 1 for a silicone oil dispersion

[1] Mineral oil dispersion/test detergent
[2] Silicone oil dispersion/test detergent The courses of the plots for the test for defoaming action for examples 3 and 4 and for comparative example 1 are depicted in FIG. 4 (for mineral oil dispersions) and FIG. 5 (for silicone oil dispersions).

German application 102004005404.6 filed on Feb. 3, 2004 is incorporated herein by reference.

Obviously, numerous modifications and variations of the present invention are possible in light of the above teachings. It is therefore to be understood that within the scope of the appended claims, the invention may be practiced otherwise than as specifically described herein.

The invention claimed is:

1. A precipitated silica having

| BET | 100-190 m$^2$/g, |
|---|---|
| Modified Sears number | 8-20 ml/(5 g), |
| Sears number/BET ratio | <0.12 ml/(5 m$^2$), and |
| pH | >8. |

2. The precipitated silica as claimed in claim 1, having a BET surface area of 120-190 m$^2$/g.

3. The precipitated silica as claimed in claim 1, having a CTAB surface area of 100-190 m$^2$/g.

4. The precipitated silica as claimed in claim 1, having a BET/CTAB ratio of 0.8-1.2.

5. The precipitated silica as claimed in claim 1, having a DBP<300 g/(100 g).

6. The precipitated silica as claimed in claim 1, having a mean particle size d$_{50}$ of less than 14 μm.

7. The precipitated silica as claimed in claim 1, having an average tapped density of less than 150 g/l.

8. The precipitated silica as claimed in claim 1, having a loss on ignition of 2-6%.

9. A defoamer formulation comprising the precipitated silica as claimed in claim 1.

10. A silicone rubber comprising the precipitated silica as claimed in claim 1.

11. A HTV silicon rubber comprising a lightening additive comprising the silica as claimed in claim 1.

12. A flow assistant comprising the precipitated silica as claimed in claim 1.

13. A carrier comprising the precipitated silica as claimed in claim 1.

14. An antiblocking agent comprising the precipitated silica as claimed in claim 1.

15. The precipitated silica as claimed in claim 1, having a loss on ignition ranging from 2 to 4%.

16. A process for preparing a precipitated silica, comprising:
- a) precipitating a silicate solution to form a precipitated silica,
- b) filtering the precipitated silicate solution to form a filtercake of the precipitated silica,
- c) liquefying the filtercake by adding water to form a suspension of the precipitated silica,
- d) drying the suspension,
- f) milling the precipitated silica, wherein the process further comprises

- e) alkalifying the precipitated silica by adding at least one basic agent thereto wherein the resulting precipitated silica has the following characteristics: BET 100-190 $m^2/g$, Modified Sears number 8-20 ml/(5 g), Sears number/BET ratio<0.12 ml/(5 m2), and pH>8.

17. The process as claimed in claim 16, wherein the alkalifying is carried out simultaneously with the liquefying of the filtercake.

18. The process as claimed in claim 16, wherein the alkalifying is carried out after the liquefying of the filtercake but before the drying of the filtercake.

19. The process as claimed in claim 16, wherein the alkalifying is carried out after the drying of the filtercake.

20. The process as claimed in claim 16, wherein the alkalifying is carried out before and after the drying of the filtercake.

21. The process as claimed in claim 16, wherein the alkalifying step adjusts the pH of the precipitated silica or of the suspension from 7 to 11 by addition of a basic component.

22. The process as claimed in claim 16, wherein the basic agent is at least one member selected from the group consisting of an alkali metal hydroxide, an alkali metal carbonate, an alkaline earth metal hydroxide, an alkaline earth metal carbonate, an alkali metal oxide, an alkaline earth metal oxide, an alkali metal silicate, an alkaline earth metal silicate, ammonia, an alkali metal aluminate, an aqueous solution thereof and a mixture thereof.

23. A precipitated silica prepared by the process as claimed in claim 16.

24. The process as claimed in claim 16, wherein the precipitating comprises:
- aa) heating an initial charge of water, or a mixture of water and a silicate, to a temperature ranging from 60 to 100° C.,
- ab) simultaneously adding the silicate solution and acid to the initial charge, and
- ac) lowering the pH by adding an acidifier to the charge.

25. The process as claimed in claim 24, wherein the pH in ab) is held at a level ranging from 7 to 11.

26. The process as claimed in claim 24, wherein the temperature of the reaction solution in ab) is held at a level ranging from 60 to 100° C.

27. The process as claimed in claim 24, wherein the simultaneous addition of waterglass and acidifier is continued to a solids content of 40 to 70 g/l and then stopped.

28. The process as claimed in claim 24, further comprising: adjusting the pH to 2 to 8 in ac) by adding an acidifier.

29. The process as claimed in claim 24, wherein the heating in aa) is carried out at a temperature ranging from 70° C. to 90° C.

30. The process as claimed in claim 24, further comprising, after the lowering of the pH:
- ad) aging the suspension at 10 to 95° C. for 0 to 72 hours.

31. The process as claimed in claim 30, wherein the aging in ad) is carried out at a temperature ranging from 40-60° C. for a time ranging from 0-12 hours.

\* \* \* \* \*